United States Patent [19]
Hobbs et al.

[11] 3,875,225

[45] Apr. 1, 1975

[54] LIQUID PHASE OXIDATION OF ESTERS TO FORM CARBOXYLIC ACIDS THEREFROM

[75] Inventors: Charles C. Hobbs, Nueces, Tex.; Hendrik A. Van't Hof, Brielle, Netherlands

[73] Assignee: Celanese Corporation, New York, N.Y.

[22] Filed: Jan. 4, 1974

[21] Appl. No.: 430,835

[52] U.S. Cl.......... 260/541, 260/514 R, 260/514 H, 260/530 R, 260/531 R, 260/540, 260/542
[51] Int. Cl............................................ C07c 51/24
[58] Field of Search.... 260/540, 541, 514 R, 514 H, 260/542, 413

[56] References Cited
UNITED STATES PATENTS

| | | | |
|---|---|---|---|
| 2,530,512 | 11/1950 | Drewitt | 260/541 |
| 3,493,609 | 2/1970 | Kronig et al. | 260/541 |

*Primary Examiner*—Vivian Garner

[57] ABSTRACT

An improved liquid phase oxidation process wherein greater amounts of esters such as ethyl acetate are converted to carboxylic acids such as acetic acid by forming a liquid reaction mixture comprising the ester and sufficient water to allow hydrolysis of the ester during the oxidation reaction. Addition of at least one ketone such as methyl ethyl ketone and optionally at least one aldehyde such as acetaldehyde to the reaction mixture improves conversion rates. In a particularly advantageous embodiment, a liquid reaction feed mixture comprising from about 30 to 40 percent ethyl acetate, about 45 to 50 percent methyl ethyl ketone, and about 5 to 10 percent acetaldehyde is oxidized in the presence of about 5 to 10 percent water to acetic acid using air, cobalt acetate catalyst, and acetic acid reaction medium.

9 Claims, No Drawings

LIQUID PHASE OXIDATION OF ESTERS TO FORM CARBOXYLIC ACIDS THEREFROM

BACKGROUND OF THE INVENTION

1. Field of the Invention

This invention relates to improvements in the liquid phase oxidation of esters to form carboxylic acids therefrom.

2. Summary of the Prior Art

Carboxylic acids, and particularly acetic acid, have many uses. For example, acetic acid may be used as a solvent or reagent in the production of rubber, plastics, pharmaceuticals, dyes, insecticides and other organic and inorganic chemicals.

Acetic acid may be produced by several processes including the liquid phase oxidation of various organic compounds such as ethyl acetate, ethanol, or paraffins, e.g., butane. In general, such a liquid phase oxidation process involves admixing such compounds with oxygen in a liquid reaction medium. See, for example, U.S. Pat. Nos. 2,530,512; 2,552,175; 2,800,504 and 3,196,182.

The liquid phase oxidation phase oxidation of ethyl acetate to form acetic acid is known to be difficult, however, because ethyl acetate is relatively inert to oxidation. As suggested in U.S. Pat. No. 2,530,512, this problem may be alleviated by oxidizing ethyl acetate under high pressure, e.g., about 400 psi, such that greater amounts of ethyl acetate can be oxidized. It is also noted therein that the presence of water in the reaction mixture is generally undesirable since it is stated that one percent water, based on the weight of ethyl acetate, considerably lengthened the "induction" period during which oxidation did not appear to take place and which also resulted in a lower eventual yield of acetic acid. Similarly, U.S. Pat. No. 2,800,504 states that esters are not easily oxidized, particularly when water is present.

The search has continued, therefore, for improved liquid phase oxidation processes able to increase the ease of conversion of ethyl acetate to acetic acid. The present invention was made as a result of this search.

SUMMARY OF THE INVENTION

Accordingly, the primary object of the present invention is to provide an improved process for the liquid phase oxidation of esters to form carboxylic acids therefrom.

Another more particular object of the present invention is to provide a novel liquid phase oxidation process for converting ethyl acetate to acetic acid without incurring or substantially alleviating the difficulties incurred by prior art processes.

In accordance with the present invention, a liquid reaction mixture containing at least one ester and at least one ketone is formed, and this liquid reaction mixture is oxidized in the presence of sufficient water to hydrolyze, or allow the hydrolysis of, the ester during the oxidation reaction. The liquid reaction mixture is so oxidized with a gas comprising molecular oxygen to form an oxygenated reaction product mixture from which carboxylic acid reaction product is recovered.

A primary aspect of the present invention is the discovery that the presence of substantial amounts of water in the oxidation zone is, surprisingly, beneficial, for hydrolysis of the ester during the oxidation reaction results in higher overall conversions of ethyl acetate to acetic acid. The presence of a ketone such as methyl ethyl ketone improves the overall rate of such a conversion.

Other objects, aspects, and advantages of the present invention will become apparent to one skilled in the art from the following description of the preferred embodiments.

DESCRIPTION OF THE PREFERRED EMBODIMENTS

While the most preferred embodiment of the present invention is illustrated in the production of acetic acid from ethyl acetate, water, and methyl ethyl ketone, and optionally, acetaldehyde, other carboxylic acids may be similarly produced from corresponding mixtures of esters, water, ketones and, optionally, aldehydes.

The carboxylic acids which may be produced in accordance with the present invention may include lower aliphatic monocarboxylic acid represented by the structural formula

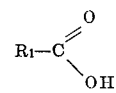

wherein $R_1$ is hydrogen or an alkyl or cycloalkyl group of from one to six carbon atoms. More typically, $R_1$ is an alkyl group of from one to six carbon atoms.

Non-limiting examples of such carboxylic acids include formic acid, acetic acid, propionic acid, butyric acid, valeric acid, hexanoic acid, hexahydrobenzoic acid (cyclohexanecarboxylic acid), cyclopentanecarboxylic acid, cyclobutanecarboxylic acid, and the like. The present invention is particularly suitable for the production of acetic acid.

Esters which may be subjected to liquid phase oxidation processes to produce carboxylic acids are well known. Such esters include lower aliphatic esters represented by the formula $R_2COOR_3$ where $R_2$ may be hydrogen or an alkyl or cycloalkyl group of from one to six, more typically one to four, carbon atoms, and where $R_3$ may be an alkyl or cycloalkyl group of from one to six, more typically two to five, carbon atoms. Ethyl acetate is particularly suitable for the production of acetic acid in the present invention.

Other non-limiting examples of such esters include isopropyl acetate and sec-butyl acetate.

The ketones used in accordance with the present invention may include lower aliphatic ketones such as those represented by the structural formulas

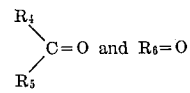

wherein $R_4$ and $R_5$ represent the same or different alkyl groups of from one to six, more typically one to five carbon atoms, and wherein $R_6$ represents a cycloalkylidene group of from four to twenty, preferably five to ten, carbon atoms. Methyl ethyl ketone is particularly preferred when converting ethyl acetate to acetic acid in accordance with the present invention.

Other non-limiting examples of such ketones include dimethyl ketone, methyl propyl ketone, methyl butyl ketone, methyl amyl ketone, diethyl ketone, ethyl propyl ketone, ethyl butyl ketone, dipropyl ketone, and cyclohexanone.

The aldehydes which may be used in accordance with the present invention may include lower aliphatic aldehydes such as those represented by the structural formula

wherein $R_7$ represents an alkyl, cycloalkyl, or aryl group of from one to seven, more typically an alkyl group of from one to three, carbon atoms. Acetaldehyde is particularly preferred when converting ethyl acetate to acetic acid.

Other non-limiting examples of such aldehydes include propionaldehyde, butyraldehyde, valeraldehyde, hexanal, and benzaldehyde.

Of course, minor amounts, e.g., up to 10 percent, of other compounds, such as alcohols, which under the conditions of the liquid phase oxidation process of the present invention can be converted to the above prescribed carboxylic acids, may be present in the reaction mixture.

Alcohols which may be subjected to the liquid phase oxidation processes to produce carboxylic acids are well known. Such alcohols include lower aliphatic alcohols represented by the formula R-OH where R is an alkyl or cycloalkyl group of from one to six carbon atoms. Ethanol may be particularly suitable for co-oxidation when ethyl acetate is converted to acetic acid in accordance with the present invention. Other non-limiting examples of such alcohols include methyl alcohol, n-propyl alcohol, isopropyl alcohol, n-butyl alcohol, sec-butyl alcohol, isoamyl alcohol, n-hexyl alcohol and cyclohexanol.

The above-described esters, ketones, aldehydes, and alcohols may be prepared or produced by any of the well known methods.

The process of the present invention may be practiced by oxidizing a liquid reaction mixture of one or more of the above-described esters and one or more of the above-described ketones in the presence of water and with a gas comprising molecular oxygen. Optionally, other compounds such as the above-discussed aldehydes may be present in the liquid reaction mixture. The presence of aldehydes such as acetaldehyde may be particularly advantageous when the ester is present in relatively high amounts, e.g., above about 10 percent of the reaction mixture.

For example, a reactor feed mixture of up to 50 percent and preferably 20 to 40 percent ester, and about 15 to 60 percent and preferably 30 to 50 percent ketone, and optionally about 1 to 30 percent aldehyde, based on the total weight of material to be oxidized, may be satisfactory. Most preferably, about 30 to 40 percent ethyl acetate, 45 to 50 percent methyl ethyl ketone and 5 to 10 percent acetaldehyde is used.

The water should be present or maintained in the liquid reaction mixture in a sufficient amount or concentration to maintain hydrolysis of the ester during the oxidation process, the hydrolysis reaction being exemplified as follows:

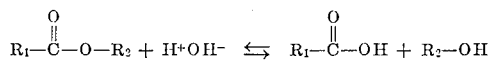

However, the water should generally be present in an amount less than about 20 percent, based on the total weight of the reaction mixture. Water concentrations significantly higher than 20 percent may lead to "oxygen starvation" and result in lowered oxidation rates, a build-up of undesired reaction products, and lowered reaction efficiencies. For example, about 3 to 20 percent, preferably 5 to 15 percent, and most preferably 5 to 10 percent water may be present in the liquid reaction mixture, based on the total weight of the liquid reaction mixture.

Upon oxidation, the above-described reaction mixtures of esters, ketones, and optionally, aldehydes, commonly produce oxygenated reaction product mixtures including several different carboxylic acids, which mixtures may be separated by well-known distillation methods. Preferably, combinations of the above-described esters, ketones and aldehydes are used to give only one or predominantly only one acid. For example, a mixture of ethyl acetate, methyl ethyl ketone and acetaldehyde upon oxidation yields substantially only acetic acid, although minor amounts, e.g., 1 to 5 percent of other carboxylic acids such as formic acid and propionic acid may also be present.

Air is commonly employed as the source of molecular oxygen, although a pure oxygen gas may also be employed. The moleclular oxygen may be provided in at least a stoichiometrically sufficient amount to convert the material to be oxidized to carboxylic acid and to compensate or allow for byproducts such as carbon dioxide. The ratio of total feed of oxygen to total feed of organic starting material is a highly variable number which depends upon the specific compositions of the feed, the desired products, and other process design factors. Typically, the oxygen-containing gas is bubbled through the liquid reaction mixture in an amount sufficient to prevent oxygen starvation which may be indicated by a low concentration of oxygen and/or a high ratio of carbon monoxide to carbon dioxide in the vent gas.

The oxidation reaction is conducted in the liquid phase, i.e., the material to be oxidized is in a liquid reaction medium. Typically, the reaction medium is a solvent for the compounds to be oxidized and is relatively inert, i.e., does not react chemically at any significant rate under the conditions of oxidation. Suitable reaction media include the above-discussed carboxylic acids where $R_1$ is an alkyl group of one or two carbon atoms. Acetic acid is preferred. Typically, the carboxylic acid reaction product or products serve as the solvent in which the reaction takes place. Benzene can also be used as the solvent although its use limits the solubility of water in the system. Benzoic acid can be used at reaction temperatures high enough to ensure a liquid solvent system.

The reaction may be carried out at any temperature and pressure sufficient to maintain the liquid phase oxidation. For example, temperatures of about 50° to 200°C, preferably 75° to 150°C, and most preferably 110°C to 140°C may be used.

Superatmospheric pressure is generally required, and pressures of about 50 to 1,000 psia, preferably 75 to 300 psia, and typically 75 to 150 psia, may be used.

Reaction or reactor residence times may be from about 0.1 to 5 hours, more typically about 0.5 to 3 hours, and most typically about 1 to 2 hours.

The liquid phase oxidation process of the present invention is usually conducted in the presence of a catalyst. Liquid phase oxidation catalysts are well known and per se are not part of the present invention.

Typical liquid phase oxidation catalysts include metals from Groups 1b, 5b, 6b, 7b, 8b and the Lanthanide series of the Periodic Table in the form of a compound soluble in the liquid reaction mixture. The Periodic Table referred to herein is the Periodic Table of the Elements appearing immediately after p. 948 of Organic Chemistry, by Morrison and Boyd; Allyn and Bacon, Inc. (1959 Ed.).

Non-limiting examples of such catalysts include the carboxylic acid-soluble compounds of cobalt, manganese, nickel, copper, cerium, praseodymium, neodymium, lanthanum, samarium, iron, mercury, chromium, antimony, uranium, molybdenum, terbium, tungsten, tantalum, columbium, vandium, zirconium, titanium, lead, tin, platinum, iridium, osmium, gold and silver, and particularly the salts of these metals with carboxylic acids such as, for example, acetic acid, propionic acid, butyric acid, isobutyric acid, valeric acid, benzoic acid and napthenic acid.

Cobalt acetate is particularly advantageous when ethanol, methyl ethyl ketone and acetaldehyde are being oxidized to acetic acid.

The above-described oxidation catalysts may be present during oxidation in an amount of about 1 to 50,000 ppm, preferably 100 to 5,000 ppm, and most preferably 200 to 2,000 ppm, based on the weight of solvent or liquid reaction medium.

The above-described liquid phase oxidation reaction may be carried out in any known stirred or non-stirred reactor or reaction vessel on a continuous, semi-continuous, or batch basis. A suitable tower reactor and its operation are described in U.S Pat. No. 2,702,741, which is incorporated herein by reference.

The carboxylic acid may be recovered from the oxygenated reaction product mixture by various means known in the art, typically including distillation. Any carboxylic acid values contained in ester form in the reaction product may also be recovered by a separate hydrolysis step followed by solvent extraction and distillation as is well known to those skilled in the art. The carboxylic acid values in ester form may also be recycled to the reaction zone for further reaction.

The invention is additionally illustrated by the following example; all parts, percentages and ratios are by weight in the example, as well as in other parts of the specification and claims, unless otherwise indicated.

SPECIFIC EXAMPLE

A run in accordance with the present invention was carried out in a reaction system comprising a vertical cylindrical reaction vessel provided with suitable fittings for feeding or injecting the reactants, including air, and catalyst solution (cobalt acetate dissolved in acetic acid) into the interior of the vessel, as well as a suitable outlet for recovery or take-off of a portion of the oxygenated reaction product mixture. A recycle conduit including a conventional centrifugal pump was also connected to the outlet for recycling a portion of the reaction mixture back into the reactor. By suitably adjusting valves in the various fittings, a ratio of recycled reaction mixture to recovered or collected reaction mixture of about 1000:1 was maintained. The reaction vessel was equipped with an electrical resistance heater to maintain reaction temperature; and vapors coming overhead from the liquid reaction mixture were condensed in a water-cooled condenser and returned to the liquid reaction mixture. A vent connected through a conventional cold trap to the upper end of the condenser was provided for removing any uncondensed vapors. In the run, the reaction was allowed to "line-out", i.e., come to approximately steady-state conditions. Next, a "timed run" was made, and during this timed run, all of the readings were taken and the volume and weight of the material fed to the reactor were measured. The liquid reactor feed and the catalyst solution were continuously supplied to the reactor and a portion of liquid oxygenated reaction product mixture was continuously withdrawn from the reactor, so as to maintain an approximately constant volume of liquid reaction mixture within the reactor during the timed run. The reaction mixture was then analyzed using conventional procedures. Other data and the results for the run are shown in the following TABLE.

TABLE[a]

| | |
|---|---|
| Composition of reactor feed, % | |
| Ethyl acetate (EtOAc) | 40 |
| Methyl ethyl ketone (MEK) | 47 |
| Acetaldehyde (AcH) | 5 |
| Other (substantially all acetic acid) | 8 |
| $H_2O$ in reaction mixture, % | 6.4 |
| Co catalyst in reaction mixture, ppm | 1000 |
| Length of timed run, hrs | 2 |
| Reactor feed during timed run, g | 205.4 |
| Catalyst soln[b] during timed run, g | 52.8 |
| Average reactor pressure[c], psia | 79 |
| Average temperature, °C | |
| Base of reactor | 130 |
| Middle of reactor | 136 |
| Wt of reactor prod collected during timed run, g | 293.7 |
| Wt of material collected in cold trap during timed run, g | 12.4 |
| Results of analysis[d], wt% | |
| Acetic acid | 69.9 |
| $H_2O$ | 6.4 |
| Formic acid | 0.17 |
| MEK | 4.1 |
| EtOAc | 18.2 |
| Ethanol | 0.23 |
| Wt accountability, % | 101.5 |
| Carbon efficiency[e], % | 85.1 |

[a] The following quantities were present during the run:
Volume of liquid in reactor plus recycle system, approximately 1000 ml.
Volume of liquid in reactor alone, approximately 800 ml.
Air rate, approximately 6.0 scfh = 3.6 scfh/in² cross-sectional area = 28 scfh/gal reactor liquid.
[b] The catalyst solution was 5000 ppm Co(II) in glacial acetic acid.
[c] Max. rec. pressure for equipment used.
[d] Analysis performed on reaction product plus cold trap amount.
[e] Carbon efficiency calculated as carbon efficiency to liquid products.

The principles, preferred embodiments, and modes of operation of the present invention have been described in the foregoing specification. The invention which is to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A process for the production of carboxylic acids represented by the structural formula

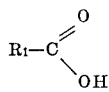

wherein $R_1$ is hydrogen or an alkyl or cycloalkyl group of from one to six carbon atoms, which process comprises a. forming a liquid reaction mixture comprising at least one ester represented by the structural formula $R_2COOR_3$ wherein $R_2$ is hydrogen or an alkyl or cycloalkyl group of from one to six carbon atoms and $R_3$ is an alkyl or cycloalkyl group of from one to six carbon atoms.

or $R_6=0$ wherein $R_4$ and $R_5$ are the same or different alkyl groups of from one to six carbon atoms and $R_6$ is a cycloalkylidene group of 4–20 carbon atoms, b. oxidizing the liquid reaction mixture in the presence of 3 to 20% water to hydrolyze the ester during the oxidation reaction at a temperature of 50°–200°C with a gas comprising molecular oxygen to form an oxygenated reaction product mixture and, c. recovering carboxylic acid reaction product from the reaction product mixture.

2. The process of claim 1 wherein the recovered carboxylic acid is a carboxylic acid represented by the structural formula

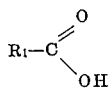

wherein $R_1$ is an alkyl group of from one to six carbon atoms.

3. The process of claim 1 wherein the ester is an ester represented by the formula $R_2COOR_3$ wherein $R_2$ is hydrogen or an alkyl group of from one to four carbon atoms and $R_3$ is an alkyl group of from two to five carbon atoms.

4. The process of claim 1 wherein the ketone is a ketone represented by the structural formula

wherein $R_4$ and $R_5$ are alkyl groups of from one to six carbon atoms.

5. A process for the production of lower aliphatic monocarboxylic acids, which process comprises a. forming a liquid reaction feed mixture comprising about 20 to 40 percent at least one ester represented by the formula $R_2COOR_3$, wherein $R_2$ is hydrogen or an alkyl or cycloalkyl group of from one to five carbon atoms and wherein $R_3$ is an alkyl or cycloalkyl group of from one to six carbon atoms, about 30 to 50 percent of at least one ketone represented by the structural formula

or $R_6 = 0$, wherein $R_4$ and $R_5$ are alkyl groups of from one to six carbon atoms, and $R_6$ represents a cycloalkylidene group of from four to twenty carbon atoms, b. oxidizing the liquid reaction mixture in the presence of about 5 to 15 percent water with concurrent hydrolysis of the ester at a temperature of about 50° to 200°C and a pressure of about 50 to 1,000 psi with a gas comprising molecular oxygen and a catalyst of at least one metal selected from Groups 1b, 5b, 6b, 7b, 8b, and the Lanthanide series of the Periodic Table to form an oxygenated reaction product mixture and, c. recovering from the reaction mixture at least one lower aliphatic carboxylic acid reaction product represented by the structural formula

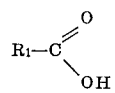

wherein $R_1$ is hydrogen or an alkyl or cycloalkyl group of from one to six carbon atoms.

6. The process of claim 5 wherein the liquid reaction mixture additionally comprises a solvent for at least one of the ester and ketone, and wherein the metal catalyst is in the form of a carboxylic acid salt soluble in the liquid reaction mixture.

7. The process of claim 6 wherein the solvent in the liquid reaction mixture is a lower aliphatic carboxylic acid represented by the strucural formula

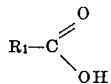

wherein $R_1$ is methyl or ethyl; wherein the reaction temperature is from 75° to 150°C, and wherein the reaction pressure is from 75 to 300 psi.

8. The process of claim 6 wherein the recovered carboxylic acid and the solvent are acetic acid, wherein the ester is ethyl acetate and wherein the ketone is methyl ethyl ketone.

9. A liquid phase oxidation process for the production of acetic acid, which process comprises a. forming a liquid reaction feed mixture comprising from about 30 to 40 percent ethyl acetate, about 45 to 50 percent methyl ethyl ketone, and about 5 to 10 percent acetaldehyde in an acetic acid solvent.

b. oxidizing the liquid reaction mixture in the presence of about 5 to 10 percent water and at a temperature of about 110° to 140°C and at a pressure of about 75 to 150 psi with molecular oxygen and from 100 to 5,000 ppm of a cobalt acetate catalyst to form an oxygenated reaction product mixture, and c. recovering acetic acid reaction product from the reaction product mixture.

* * * * *

UNITED STATES PATENT OFFICE
CERTIFICATE OF CORRECTION

PATENT NO. : 3,875,225
DATED : April 1, 1975
INVENTOR(S) : Hobbs, C. C., and Van't Hof, H. A.

It is certified that error appears in the above-identified patent and that said Letters Patent are hereby corrected as shown below:

In column 7, line 13, after "atoms", delete the period and insert -- represented by the structural formula --.

In column 7, line 56, after "40 percent" insert -- of --.

Signed and sealed this 27th day of May 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
CERTIFICATE OF CORRECTION

PATENT NO. : 3,875,225
DATED : April 1, 1975
INVENTOR(S) : Hobbs, C. C., and Van't Hof, H. A.

It is certified that error appears in the above-identified patent and that said Letters Patent are hereby corrected as shown below:

In column 7, line 13, after "atoms" in the specification as printed and immediately preceding the word "represented" as inserted by the Certificate of Correction dated 27 May 1975, insert -- and at least one ketone --.

Signed and Sealed this

*Thirty-first* Day of *January 1978*

[SEAL]

*Attest:*

RUTH C. MASON
*Attesting Officer*

LUTRELLE F. PARKER
*Acting Commissioner of Patents and Trademarks*